Oct. 11, 1966  A. J. MUNN  3,278,067
SEAL FOR CONFINING FLUID MEDIUM UNDER PRESSURE
Filed May 5, 1964
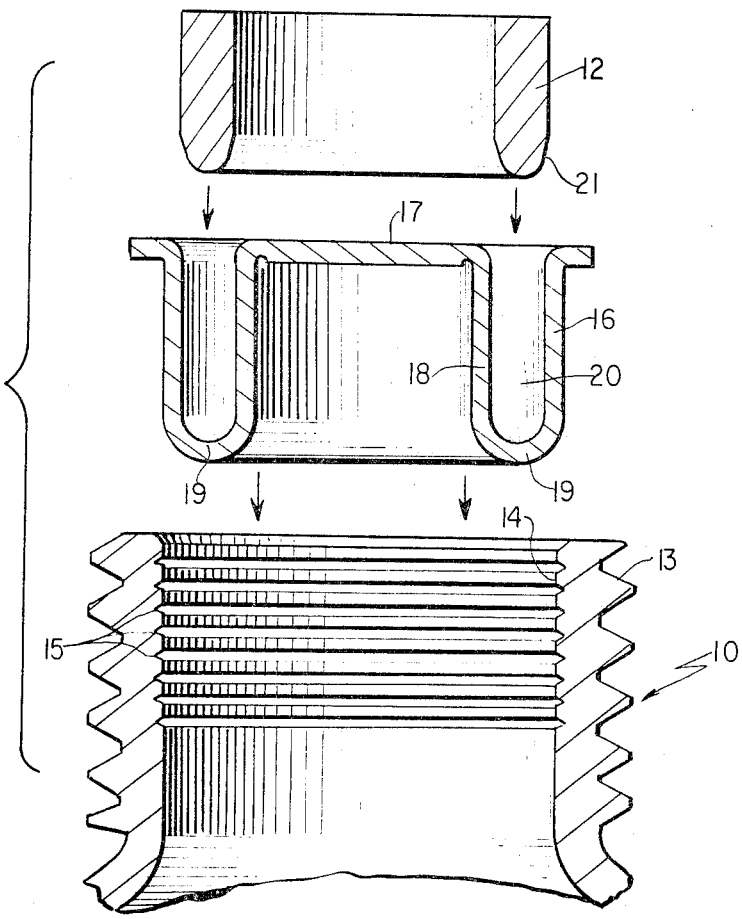
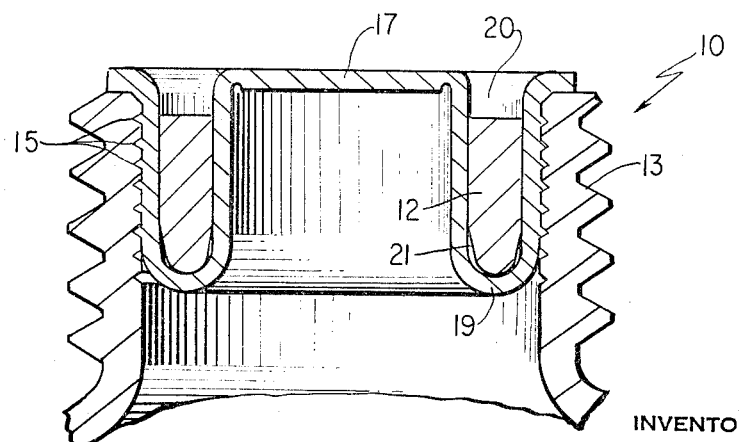
INVENTOR
ALFRED J. MUNN
BY
ATTORNEY

# United States Patent Office 3,278,067
Patented Oct. 11, 1966

3,278,067
SEAL FOR CONFINING FLUID MEDIUM
UNDER PRESSURE
Alfred J. Munn, Wayne Township, Passaic County, N.J.,
assignor to Specialties Development Corporation, Belleville, N.J., a corporation of New Jersey
Filed May 5, 1964, Ser. No. 365,021
1 Claim. (Cl. 220—27)

The present invention relates to seals for confining fluid medium under pressure, and, more particularly, to an improved metalic seal for the outlet of structures such as pipes or containers for confining the fluid medium and including a puncturable element for releasing the confined medium.

Accordingly, an object of the present invention is to provide such a seal which comprises a minimum number of simple, economical parts adapted to be readily fabricated and assembled to form the seal.

Another object is to provide such a seal which will confine fluid medium under extremely high pressure.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the acompanying drawing, forming a part of the specification, wherein:

FIG. 1 is an exploded view illustrating the parts of the seal in longitudinal cross-section.

FIG. 2 is a longitudinal sectional view of the assembled seal.

Referring now to the drawing in detail, there is shown a tubular element 10 such as the outlet spud of a rigid metallic container or an open end of a metallic pipe for confining fluid medium under pressure, a deformable metallic closure cup 11 fitted into the tubular element 10, and a rigid insert 12 fitted into the cup 11 to secure the cup within the tubular element in the manner described hereinafter.

The tubular element 10 has a screw threaded outer wall 13 and an inner wall 14 defining a bore provided with an opening at its upper end as viewed. The bore wall 14 is formed with a plurality of annularly arranged longitudinally spaced V-grooves 15. These grooves may be discontinuous but preferably are continuous as shown to provide a seal more capable of withstanding higher pressures.

The cup 11 has a thin outer cylindrical wall 16 dimensioned to closely fit the bore wall 14, and a circular central disc portion 17, adapted to be punctured by a cutter to release the confined medium under pressure into conduit means (not shown) threadily coupled to the outer wall 13 of the element 10. Preferably, the cup has an inner cylindrical wall 18 concentric with the outer wall 16 and joined thereto at its lower end by an annular web 19 so that the disc portion 17 is at the opening or upper end of the bore and a deep annular groove 20 is provided between the walls 16 and 18 for reception of the insert 12.

The insert 12 is a hollow cylindrical member formed of hardened steel for example, and has an outer wall of a diameter slightly exceeding the inner diameter of the outer wall 16 of the cup so that when the insert is forced into the cup the metal of the outer wall cold flows into the grooves 15 (FIG. 2). Preferably, the lower end of the outer wall of the insert is rounded or tapered at 21 to facilitate wedging entry of the insert within the wall 16 of the cup.

As a specific example of a seal construction in accordance with the present invention, the element 10 was constructed of Chrome-Moly 4130 steel, the cup 11 was constructed of S.A.E. 1010 steel, and the insert 12 was constructed of drill rod, S.A.E. 1080 steel.

The wall 14 of the element 10 had an inner diameter of 0.437 inch, and the grooves 15 had a depth of 0.010 inch with six grooves being spaced longitudinally about 0.025 inch apart. The wall 16 of the cup 11 had a thickness of 0.017 inch, an outer diameter of 0.435 inch, and an inner diameter of 0.401 inch; and the insert 12 had an outer diameter which exceeded the inner diameter of the wall 16 by between 0.010 and 0.014 inch, whereby upon forcing the insert into the cup the metal of the wall 16 flowed downward and outward into the grooves 15.

Preliminary tests of the foregoing seal construction indicated that there was zero bubble test leakage up to 4600 p.s.i. of air pressure, and that the burst of the cup and insert assembly from the element 10 required between 9000 and 12,000 p.s.i. hydrostatic pressure.

From the foregoing description, it will be seen that the present invention provides a secure, leak-proof seal for confining fluid medium under extremely high pressure.

As various changes may be made in the form, construction and arrangement of the arts herein, without departing from the spirit and scope of the invention and without sacrificing any of its advantages, it is to be understood that all matter herein is to be interpreted as illustrative and not in any limiting sense.

I claim:

In a seal construction having zero bubble test leakage up to 4600 p.s.i. of air pressure and requiring between 9000 and 12,000 p.s.i. hydrostatic pressure to burst the same, the combination of structure for confining fluid medium under pressure of between 4600 and 9000 p.s.i. and having a rigid bore wall formed with a plurality of parallel closely spaced shallow grooves; an inverted generally cup-shaped closure constructed of a steel having cold flow characteristics when subjected to mechanical pressure, said closure including a thin outer cylindrical wall portion dimensioned to frictionally engage at its outer side wall with said bore wall, an inner cylindrical wall portion parallel to and concentric with said outer wall portion, an annular arcuate cross-sectioned web connecting said inner and outer wall portions at the lower ends thereof to space apart said inner and outer wall portions and provide an annular space therebetween, a puncturable disc portion at the upper end of said inner wall portion and a flange at the upper end of said outer wall portion for limiting entry of said closure into said bore wall; and a hollow cylindrical rigid insert having a wedge at its leading edge and being forced into said space to expand said outer wall portion and cause cold flow of portions thereof into said grooves to thereby interlock said outer wall portion and said bore wall.

References Cited by the Examiner

UNITED STATES PATENTS

| | | | |
|---|---|---|---|
| 721,507 | 2/1903 | Fogg | 220—46 |
| 2,543,430 | 2/1951 | Anderson | 220—24.5 |
| 2,661,128 | 12/1953 | Rieke | 220—27 |
| 3,135,414 | 6/1964 | Lee | 220—24.5 |

THERON E. CONDON, *Primary Examiner.*

G. T. HALL, *Assistant Examiner.*